United States Patent
O'Shea

(10) Patent No.: US 12,502,714 B2
(45) Date of Patent: Dec. 23, 2025

(54) ADDITIVE MANUFACTURING BUILD REMOVAL DEVICE AND SYSTEM

(71) Applicant: Howmedica Osteonics Corp., Mahwah, NJ (US)

(72) Inventor: Alan O'Shea, County Cork (IE)

(73) Assignee: Howmedica Osteonics Corp., Mahwah, NJ (US)

( * ) Notice: Subject to any disclaimer, the term of this patent is extended or adjusted under 35 U.S.C. 154(b) by 223 days.

(21) Appl. No.: 18/511,278

(22) Filed: Nov. 16, 2023

(65) Prior Publication Data

US 2024/0165711 A1     May 23, 2024

Related U.S. Application Data

(60) Provisional application No. 63/426,162, filed on Nov. 17, 2022.

(51) Int. Cl.
*B22F 12/30* (2021.01)
*B22F 12/88* (2021.01)
*B33Y 30/00* (2015.01)
*B33Y 40/20* (2020.01)

(52) U.S. Cl.
CPC .............. *B22F 12/88* (2021.01); *B22F 12/30* (2021.01); *B33Y 30/00* (2014.12); *B33Y 40/20* (2020.01)

(58) Field of Classification Search
None
See application file for complete search history.

(56) References Cited

U.S. PATENT DOCUMENTS

| | | |
|---|---|---|
| 7,901,604 B2 | 3/2011 | Oberhofer et al. |
| 8,021,138 B2 | 9/2011 | Green |
| 8,668,859 B2 | 3/2014 | Pettis |
| 8,753,105 B2 | 6/2014 | Scott |
| 8,903,533 B2 | 12/2014 | Eggers et al. |
| 8,994,592 B2 | 3/2015 | Scott et al. |
| 9,475,234 B2 | 10/2016 | Morikawa |
| 9,517,592 B2 | 12/2016 | Yoo et al. |
| 9,597,730 B2 | 3/2017 | Mironets et al. |

(Continued)

FOREIGN PATENT DOCUMENTS

| | | |
|---|---|---|
| CN | 105921745 A | 9/2016 |
| CN | 106032062 A | 10/2016 |

(Continued)

OTHER PUBLICATIONS

EESR for Application No. 23210595.7 dated Apr. 26, 2024. 11 pgs.
European Search Report including Written Opinion for Application No. EP19180314.7, dated Aug. 5, 2019, pp. 1-7.

*Primary Examiner* — Yung-Sheng M Tsui
(74) *Attorney, Agent, or Firm* — Lerner David LLP

(57) ABSTRACT

A receptacle for use in the retention and transfer of an in-process fused powder build structure from an additive manufacturing machine includes a base and a panel. The base includes a bottom surface. The panel includes a frame and a roller extending from the frame. The frame is attached or attachable to the base such that the panel is moveable between a first position in which a top surface of the roller lies in a first plane parallel to a second plane defined by the bottom surface of the base and a second position in which the panel and the base surround the build structure when the build structure is retained by the receptacle.

15 Claims, 9 Drawing Sheets

(56) References Cited

U.S. PATENT DOCUMENTS

| | | |
|---|---|---|
| 10,543,530 B2 | 1/2020 | Hermann et al. |
| 10,787,352 B2 | 9/2020 | Huebinger et al. |
| 10,913,206 B2 | 2/2021 | Donovan et al. |
| 11,014,296 B2 | 5/2021 | De Pena et al. |
| 11,135,768 B2 * | 10/2021 | Herzog .................. B33Y 50/02 |
| 11,167,492 B2 | 11/2021 | Morral et al. |
| 2002/0090410 A1 | 7/2002 | Tochimoto et al. |
| 2003/0173695 A1 | 9/2003 | Monkhouse et al. |
| 2007/0126157 A1 | 6/2007 | Bredt |
| 2011/0241947 A1 | 10/2011 | Scott et al. |
| 2013/0244040 A1 | 9/2013 | Oshima |
| 2013/0316081 A1 | 11/2013 | Kovalcik et al. |
| 2014/0065194 A1 | 3/2014 | Yoo et al. |
| 2014/0319735 A1 | 10/2014 | El-Siblani et al. |
| 2015/0072293 A1 | 3/2015 | DeSimone et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0165690 A1 | 6/2015 | Tow |
| 2015/0183166 A1 | 7/2015 | Yoo et al. |
| 2015/0321427 A1 | 11/2015 | Gunnarsson et al. |
| 2016/0046072 A1 | 2/2016 | Rolland et al. |
| 2016/0046075 A1 | 2/2016 | DeSimone et al. |
| 2016/0059484 A1 | 3/2016 | DeSimone et al. |
| 2016/0059486 A1 | 3/2016 | DeSimone et al. |
| 2016/0059487 A1 | 3/2016 | DeSimone et al. |
| 2016/0067740 A1 | 3/2016 | Voris et al. |
| 2016/0075091 A1 | 3/2016 | Cable |
| 2016/0096326 A1 | 4/2016 | Naware |
| 2016/0096327 A1 | 4/2016 | Fry et al. |
| 2016/0136887 A1 | 5/2016 | Guillemette et al. |
| 2016/0136889 A1 | 5/2016 | Rolland et al. |
| 2016/0137838 A1 | 5/2016 | Rolland et al. |
| 2016/0137839 A1 | 5/2016 | Rolland et al. |
| 2016/0144428 A1 | 5/2016 | Mironets et al. |
| 2016/0160077 A1 | 6/2016 | Rolland et al. |
| 2016/0176118 A1 | 6/2016 | Reese et al. |
| 2016/0193786 A1 | 7/2016 | Moore et al. |
| 2016/0193787 A1 | 7/2016 | Yoo et al. |
| 2016/0200052 A1 | 7/2016 | Moore et al. |
| 2016/0200084 A1 | 7/2016 | Hays et al. |
| 2016/0207265 A1 | 7/2016 | Yoo et al. |
| 2016/0271878 A1 | 9/2016 | Nuechterlein et al. |
| 2016/0279871 A1 | 9/2016 | Heugel et al. |
| 2016/0297104 A1 | 10/2016 | Guillemette et al. |
| 2016/0303793 A1 | 10/2016 | Ermoshkin et al. |
| 2016/0311158 A1 | 10/2016 | DeSimone et al. |
| 2016/0318257 A1 | 11/2016 | Brooks et al. |
| 2016/0325493 A1 | 11/2016 | DeSimone et al. |
| 2016/0332387 A1 | 11/2016 | Jondal et al. |
| 2016/0369096 A1 | 12/2016 | Rolland et al. |
| 2017/0001374 A1 | 1/2017 | Graham et al. |
| 2017/0028651 A1 | 2/2017 | Versluys et al. |
| 2017/0036400 A1 | 2/2017 | Loeffler et al. |
| 2017/0036404 A1 | 2/2017 | Rengers et al. |
| 2017/0050379 A1 | 2/2017 | Houben et al. |
| 2017/0069817 A1 | 3/2017 | Cauchon et al. |
| 2017/0100885 A1 | 4/2017 | DeSimone et al. |
| 2017/0113415 A1 | 4/2017 | DeSimone et al. |
| 2017/0113416 A1 | 4/2017 | DeSimone et al. |
| 2017/0120332 A1 | 5/2017 | DeMuth et al. |
| 2017/0151718 A1 | 6/2017 | Rolland et al. |
| 2017/0151723 A1 | 6/2017 | Yoo et al. |
| 2017/0173871 A1 | 6/2017 | Ermoshkin et al. |
| 2017/0173872 A1 | 6/2017 | McCall et al. |
| 2017/0173880 A1 | 6/2017 | Desimone et al. |
| 2017/0203514 A1 * | 7/2017 | Mccoy .................. B29C 35/045 |
| 2017/0210077 A1 | 7/2017 | Ermoshkin et al. |
| 2017/0217106 A1 | 8/2017 | Reese et al. |
| 2017/0239725 A1 | 8/2017 | Ufton |
| 2017/0239726 A1 | 8/2017 | Palumbo et al. |
| 2017/0239887 A1 | 8/2017 | Rolland et al. |
| 2017/0252812 A1 | 9/2017 | Mykulowycz et al. |
| 2017/0252813 A1 | 9/2017 | Myerberg et al. |
| 2017/0252814 A1 | 9/2017 | Myerberg et al. |
| 2017/0252815 A1 | 9/2017 | Fontana et al. |
| 2017/0252816 A1 | 9/2017 | Shim et al. |
| 2017/0252817 A1 | 9/2017 | Mykulowycz et al. |
| 2017/0252818 A1 | 9/2017 | Gibson et al. |
| 2017/0252819 A1 | 9/2017 | Gibson et al. |
| 2017/0252820 A1 | 9/2017 | Myerberg et al. |
| 2017/0252967 A9 | 9/2017 | Guillemette et al. |
| 2017/0259502 A1 | 9/2017 | Chapiro et al. |
| 2017/0266890 A1 | 9/2017 | Volk |
| 2017/0291804 A1 | 10/2017 | Craft et al. |
| 2017/0297097 A1 | 10/2017 | Gibson et al. |
| 2017/0297098 A1 | 10/2017 | Myerberg et al. |
| 2017/0297099 A1 | 10/2017 | Gibson et al. |
| 2017/0297100 A1 | 10/2017 | Gibson et al. |
| 2017/0297102 A1 | 10/2017 | Chin et al. |
| 2017/0297103 A1 | 10/2017 | Myerberg et al. |
| 2017/0297104 A1 | 10/2017 | Gibson et al. |
| 2017/0297106 A1 | 10/2017 | Myerberg et al. |
| 2017/0297111 A1 | 10/2017 | Myerberg et al. |
| 2017/0326642 A1 | 11/2017 | Shea et al. |
| 2017/0326643 A1 | 11/2017 | Barr |
| 2017/0333994 A1 | 11/2017 | Schmitt et al. |
| 2017/0355132 A1 | 12/2017 | Moore |
| 2017/0368759 A1 | 12/2017 | Penny et al. |
| 2018/0001552 A1 | 1/2018 | Dachs, II et al. |
| 2018/0009162 A1 | 1/2018 | Moore |
| 2018/0015662 A1 | 1/2018 | Ermoshkin et al. |
| 2018/0015669 A1 | 1/2018 | Moore et al. |
| 2018/0022034 A1 | 1/2018 | Sutter et al. |
| 2018/0022044 A1 | 1/2018 | Dulkiewicz et al. |
| 2018/0222115 A1 | 8/2018 | Watanabe et al. |
| 2018/0345371 A1 | 12/2018 | Mamrak et al. |
| 2022/0227048 A1 * | 7/2022 | Huber .................. B29C 64/236 |

FOREIGN PATENT DOCUMENTS

| | | | |
|---|---|---|---|
| CN | 207808512 U | 9/2018 | |
| CN | 215468107 U | 1/2022 | |
| DE | 102009020987 A1 | 11/2010 | |
| WO | WO-2013075696 A1 * | 5/2013 | ........... B29C 64/245 |
| WO | 2015009444 A1 | 1/2015 | |
| WO | 2015112998 A1 | 7/2015 | |
| WO | 2016055523 A1 | 4/2016 | |
| WO | 2016078800 A1 | 5/2016 | |
| WO | 2019213154 A1 | 11/2019 | |

* cited by examiner

ADDITIVE MANUFACTURING BUILD REMOVAL DEVICE AND SYSTEM

CROSS-REFERENCE TO RELATED APPLICATION

The present application claims the benefit of the filing date of U.S. Provisional Patent Application No. 63/426,162 filed Nov. 17, 2022, the disclosure of which is hereby incorporated herein by reference.

BACKGROUND OF THE INVENTION

In the field of additive manufacturing (AM), post-processing steps are often necessary but time consuming and costly. Some AM (i.e., three-dimensional printing) techniques, such as electron beam melting (EBM) processes, require the use of metallic powder, e.g., titanium or titanium alloy powder, which has relatively high material costs and requires careful processing as the powder is highly flammable in an oxygenated environment. AM processes such as EBM processes result in fused powder build structures made of desired components, which may be in-process components requiring further processing, and excess powder, which may include powder that was partially heated during the formation of the in-process components, surrounding the desired components. Following such processes, the fabricated in-process components and powder unused during fabrication need to be removed from the AM machine, e.g., EBM machine, and recovered in a safe and effective manner. This recovery process often requires significant downtime to allow the AM machine to cool down before a technician can manually remove a fabricated build structure.

Efforts have been made to address such post-processing bottlenecks. For example, to eliminate the need for an AM machine to cool down before removing build structures, a clamping tool with teeth has been used in place of manual lifting. However, because the clamping tool crushes through excess powder surrounding fabricated components of a build structure, it is largely ineffective at lifting fabricated build structures and makes removal of such build structures even more time consuming when the clamping tool is unable to remove the build structure and a manual removal process is thus used in the alternative.

Other devices have been developed to remove fabricated build structures. One removal device involves a collecting box placed in a molding apparatus to hold fabricated build structures including components and excess powder, which are later removed with a cart and transported to a powder recovery system. This removal device, however, is limited because the box is used during the fabrication process and is thus exposed to the environmental conditions of the molding apparatus. Moreover, the box only works with machines specifically configured to accommodate it. Therefore, further improvements are needed for safely and efficiently removing and transferring fabricated build structures for post-processing.

BRIEF SUMMARY OF THE INVENTION

In accordance with an aspect, a build removal tool and a receptacle with a base and a panel. The panel may include a rotatable frame roller attached to the frame configured for the removal and transport an in-process fused powder build structure from an AM machine for post-processing without direct contact by the user with the build structure. The build removal tool and receptacle may be configured to work in tandem. The build removal tool may be used to transfer the build structure to the receptacle, e.g., by pulling out the build structure from the AM machine and sliding the build structure over the frame of the receptacle and into an enclosure of the receptacle. The receptacle may retain the build structure during transportation of the build structure and any excess powder that becomes separated from the build structure. In this manner, the build structure may be safely and efficiently removed for post-processing, whether hot or cold, thus eliminating downtime to allow the AM machine to cool down. In some arrangements, the frame may include a cavity that may be configured to capture and retain excess powder during the transfer of the build structure to the receptacle from the AM machine, which allows for efficient conservation of build materials such as costly metal powders, e.g., but not limited to, titanium or titanium alloy powder.

In some arrangements, the receptacle may have a latching mechanism that may be configured to securely attach the panel, e.g., the frame of the panel, to the base to prevent rotation of the panel until the latching mechanism is unlatched. In this manner, the build structure and any excess powder from the build structure may be reliably transported in the receptacle without falling out. In some arrangements, the receptacle may have handles that extend from opposing walls of the base and thereby are configured for use in manually lifting and moving the receptacle. In some arrangements, the handles may be configured to reinforce either one of or both walls of the base from which the handles may extend. In this manner, the receptacle may be configured to hold heavier build structures than a similar receptacle without such handles.

In some arrangements, an AM machine may be configured with a removable build plate such that a build plate with a build structure fabricated on the build plate may be removable from the AM machine upon completion, or even during fabrication as needed, of the build structure and replaced with a clean build plate. Such a configuration may reduce AM machine downtime between builds as a clean build plate from the stack replaces the previous one. This further improves the efficiency and safety as it affords technicians the ability to quickly remove and relocate to a safer environment (e.g., but not limited to, an oxygen-free environment) before prying the build structure off the removable build plate.

In another aspect, a receptacle for use in the retention and transfer of an in-process fused powder build structure from an AM machine may include a base and a panel. The base may include a bottom surface, and the panel may include a frame and one or more rollers that may extend from the frame. The frame may be attached or attachable to the base such that the panel may be moveable between a first position in which a top surface of the roller lies in a first plane parallel to a second plane defined by the bottom surface of the base and a second position in which the panel and the base surround the build structure when the build structure is retained by the receptacle. In some arrangements, the first plane and the second plane may be coplanar.

In some arrangements, the frame may be extended beneath and along a length of each of the one or more rollers. In some such arrangements, the frame may be configured to catch powder from the build structure. In some arrangements, this frame configuration may be such that the powder may be caught while the frame is in the first position. Once captured, the frame may further be configured to retain the captured powder even after the frame is moved to the second position.

In some arrangements, the panel may be a door in which the door may further include a hinge. In some arrangements, the frame may attach to the base such that the panel may be rotated between the first position and the second position.

In some arrangements, a stopper may be attached to the base or the panel. In some such arrangements, the stopper may be configured to prevent the panel from rotating beyond the first position and thereby may be configured to prevent rotation of the panel away from the base beyond a position in which the first plane and the second plane are coplanar. In some arrangements, the base and the panel may be configured to additionally prevent the frame from rotating towards the base and past the second position.

In some arrangements, the receptacle may further include a first flange and a second flange on opposite sides of the panel. In some such arrangements, each of the first and the second flanges may be configured for placement on respective surfaces such that the first and the second flanges may support the receptacle.

In some arrangements, at least one location of the panel may be detachably attached to the base in second position by a latching mechanism.

In accordance with another aspect, an AM system may include a receptacle according to any of the foregoing arrangements of the receptacle and a build removal tool for use in the removal of the build structure from a build plate in the AM machine. The build removal tool may have a shape such that the build removal tool may be configured to substantially correspond to a perimeter of a build structure such that the build removal tool may be placed over the build structure and may be configured to be slid along the roller and into the receptacle while retaining the build structure.

In some arrangements, the AM system may include a prying tool that may be configured to pry loose the build structure from a build plate of the AM machine on which the build structure is formed. Such prying tool additionally may be used separately from the receptacle and the build removal tool.

In some arrangements, the build removal tool may include a wall that may define a notch. In some such arrangements, the prying tool may include a handle portion on one end and a wedge portion on an opposite end of the prying tool. The notch may then be configured for receiving and limiting movement of the wedge portion of the prying tool when the wedge portion is placed under the build removal tool and the handle portion is pressed downwardly against a build plate of the AM machine. Additionally, the handle portion may cause an upward pivot movement of the wedge portion against the build structure when the handle portion is pressed downwardly against the build plate of the AM machine while the wedge portion is under the build structure. In some arrangements, the notch may be located on the same side of the build removal tool from which the handle extends or otherwise a side of the build removal tool closest to the user.

In some arrangements, the build removal tool may include a plurality of walls in a rectangular shape defining the perimeter and may be configured to be placed around the build structure. The build removal tool may further include a handle extending from its walls. In some such arrangements, a first wall of the plurality of walls of the build removal tool may have a cutout that allows for passage of loose powder during the removal of the build structure from the build plate. In some such arrangements, the handle configured for use in pulling the build removal tool may extend from a second wall of the plurality of walls of the build removal tool opposite the first wall.

In some arrangements, the build removal tool according to any of the foregoing arrangements may be separate from the AM system.

In accordance with another aspect, an AM machine may include a build plate configured such that a receptacle according to any of the foregoing arrangements defines a perimeter sufficient to surround the build structure when built on the build plate. In some arrangements, the AM machine and the receptacle may be part of a system in which the receptacle may be configured for placement on the build plate such that no portion of the perimeter of the build structure extends beyond the build plate.

In another aspect, an AM system may include a lifting mechanism and a receptacle according to any of the foregoing arrangements of the receptacle. In some such arrangements, the base of the receptacle may have a wall and a flange extending from the wall such that the flange may be configured for attachment to the lifting mechanism.

In some arrangements, the AM system may include an AM machine and a post-processing system that may be configured for separating one or more components from portions of the build structure unintended for further processing. In some such arrangements, the lifting mechanism may be moveable between a location adjacent to the AM machine and the post-processing system. In some arrangements, the post-processing system may be a component recovery system configured for the separation of the one or more components from the portions of the build structure unintended for further processing. In some such arrangements, the component recovery system may be further configured as a powder recovery system configured for recovering powder removed from the build structure.

In accordance with another aspect, an in-process build structure from an AM machine may be removed by a process. In the process, a build structure may be surrounded by the build removal tool, and the build removal tool may be pulled into a receptacle such that a bottom base of the receptacle overlaps a bottom opening defined by the build removal tool. Subsequently, the build structure may then be transported in the receptacle to a component recovery system.

In some arrangements, the build structure may be transported in the receptacle that may be supported by a lift crane. In some arrangements, the receptacle may be supported by the lift crane. In some such arrangements, a first handle and a second handle of the receptacle may be supported by the lift crane.

In some arrangements, the build structure may be slid over a roller attached to the receptacle before the bottom base of the receptacle overlaps the bottom opening defined by the build removal tool. In some arrangements, the build removal tool may include a handle that may extend from the build removal tool such that the pulling of the build removal tool may be performed by pulling the handle.

In some arrangements, loose powder captured by the build removal tool may be released through a cutout defined by the build removal tool during the pulling of the build removal tool into the receptacle.

In some arrangements, loose powder released through the cutout may be captured within a cavity defined by the panel.

In some arrangements, the receptacle may be attached to a delivery apparatus.

In some arrangements, the panel of the receptacle may be unlatched from the base of the receptacle such that the panel may be rotated away from the base to a position in which a plane defined by the panel may be substantially parallel to a plane defined by a build plate of the AM machine. In some arrangements, the panel may be configured to rotate until a panel stopper attached to the panel of the receptacle contacts the base of the receptacle or until a base stopper contacts the panel.

In some arrangements, the build structure may be pried loose from the build plate of the AM machine, e.g., by a prying tool received through a notch defined by the build removal tool.

In accordance with another aspect, a receptacle used for the retention and transfer of an in-process fused powder build structure from an AM machine may include a base and a panel. The base may include a base including a bottom surface and four walls extending from the base, and the panel may include a frame that may be rotatably attached to the base by a hinge such that the frame can rotate between a first position and a second position according to any of the foregoing arrangements of the first position and the second position. The frame may include a roller or a pair of rollers that extend from the frame and a cavity that extends beneath and along the length of the roller(s), such that the cavity may be configured to capture loose powder from a build structure slid into the receptacle. The frame may further include a stopper that may be positioned to prevent the frame from rotating beyond the first position. The base may additionally include a latching mechanism configured to detachably attach the frame to the base in at least one location. The base may further include a first flange, a second flange, and a third flange. The first flange and second flange may be on opposite sides of the receptacle and may be configured to support and/or reinforce the receptacle. The third flange may be located opposite of the panel and may be configured to attach to a lifting and/or transporting mechanism.

In accordance with another aspect, an AM system may include a receptacle, a build removal tool, a prying tool, and a lifting and/or transporting mechanism. The receptacle may be according to any of the foregoing arrangements of the receptacle. The build removal tool may be configured for removing of a build structure from a build plate, such that the build removal tool may include a plurality of walls in a rectangular shape defining the perimeter to be placed around the build structure. The build removal tool may further include a handle extending from the walls situated to be pulled such that the build removal tool can slide the build structure along a roller and into the receptacle. In another aspect, the prying tool may be configured to pry loose the build structure from the build plate of the AM machine on which the build structure is formed. In another aspect, the lifting mechanism may be configured to lift and transport the build structure in the receptacle such that the third flange of the receptacle may be configured to for attachment to the lifting mechanism.

BRIEF DESCRIPTION OF THE DRAWINGS

A more complete appreciation of the subject matter of the present disclosure and the various advantages thereof may be realized by reference to the following detailed description which refers to the accompanying drawings, in which.

DETAILED DESCRIPTION

The specific examples herein relate to the removal and transfer of an in-process fused powder build structure from an AM machine such as an EBM machine or a laser melting machine, e.g., a direct metal laser melting machine, for post-processing with the specific goal of making the removal and transfer processes safer and more efficient. Examples described herein refer to instruments or systems of corresponding instruments that work in tandem. For example, an AM system may include a receptacle, a build removal tool, a prying tool, and a delivery apparatus for transporting and lifting the receptacle and a build structure, which work in concert in the removal and transfer of a build structure from an AM machine. However, the use or non-use of any one of these components is not limited by the use or non-use of the other components as any of the components may be employed individually in the build removal process.

Figure 1:
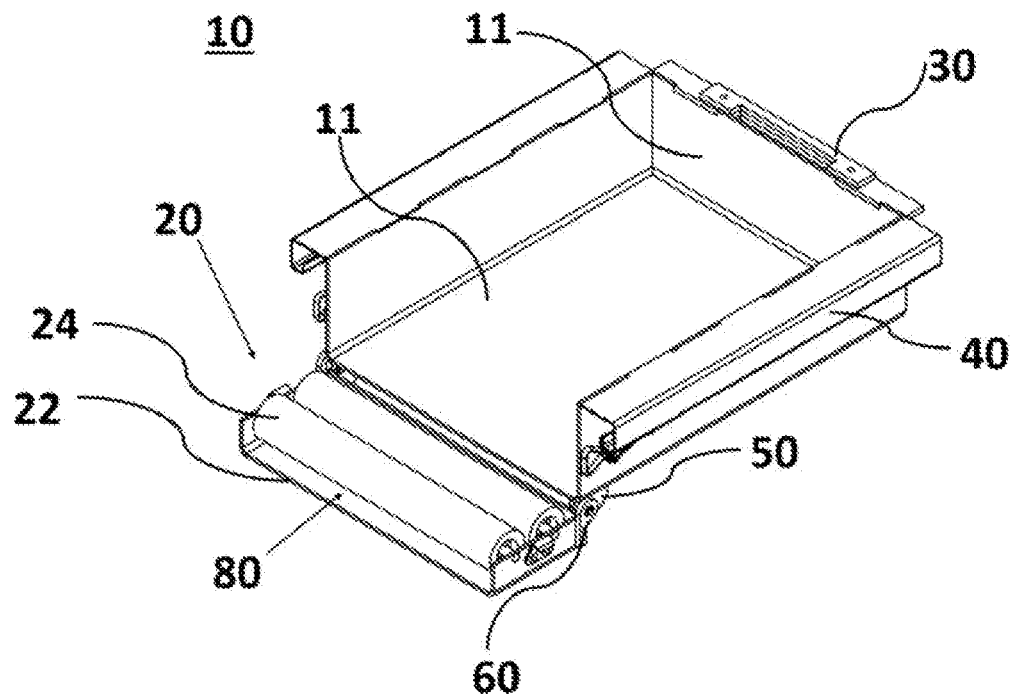
FIG. 1 is a perspective view of a receptacle for the retention and transfer of an in-process fused powder build structure from an AM machine, the receptacle being shown in an open position, in accordance with an aspect.

Referring now to the drawings, as shown in FIG. 1, receptacle 10 generally includes base 11 providing a bottom surface and side walls of the receptacle and panel 20 acting as a door for the receptacle. While receptacle 10 is shown as having a generally rectangular profile, receptacle 10 is not limited to having a particular profile and may have other geometric profiles, e.g., circular, triangular, etc. In some arrangements, receptacle 10 may be tailored to approximately the size of a build structure such that the size of receptacle 10 is appropriate hold an entire build structure without significant clearance in order to inhibit movement of the build structure during transport of the build structure. Alternatively, the size of receptacle 10 may correspond to the size of a build plate such that receptacle 10 is configured to hold the build plate in instances where the build plate is removable.

In the example of FIG. 1, receptacle 10 includes hinge mechanism 60 and panel 20 of receptacle 10 includes frame 22 attached to base 11 by the hinge mechanism such that the frame and thereby the panel rotates relative to the base. A width of frame 22, as taken in a direction perpendicular to a direction of entry of a build structure into the receptacle, and a height of the frame, as taken in a direction perpendicular to the width and to a thickness of the frame, may be congruent to the walls of panel 20, but the frame is not limited by shape or size although the frame preferably has a size and shape that retains excess powder that may separate from the build structure, in particular during transport of the receptacle. The dimensions of frame 22 may be determined, for example, by either one of or both the size of a build structure and a distance that build structure needs to travel to reach receptacle 10. Alternatively, frame 22 may be extendable and retractable such that the dimensions of frame 22 are variable.

Panel 20 further includes a pair of rollers 24 extending across the width of frame 22, although in alternative arrangements, the panel may include only one roller or a greater number of rollers. Each roller 24 is attached to frame 22 such that the roller can freely rotate to facilitate sliding of objects, e.g., a build structure, over the roller and into and out of receptacle 10. In the example shown, each roller 24 has an elongated cylindrical shape, but the roller or plurality of rollers may be in other forms, e.g., spherical in which the roller may be one or more roller ball transfer bearings. When using roller ball transfer bearings, multiple rollers may be placed in various configurations, such as but not limited to across the width of frame 22, over the area of the frame, or at the corners of the frame. The rollers 24 may be configured such that the top surface of the rollers 24 is slightly higher (i.e., farther from the ground) than the bottom surface of the base 11 when the panel 22 is in a horizontal position. As further shown, frame 22 forms cavity 80 that extends beneath a full length of each roller 24 to provide a trough for collecting excess powder as a build structure is removed from an AM machine and slid over the rollers and into receptacle 10. In this manner, costly materials e.g., metal powders such as but not limited to titanium and titanium alloy powders, may be conserved for later reuse in an AM machine in a safe and time efficient manner.

Figure 2:
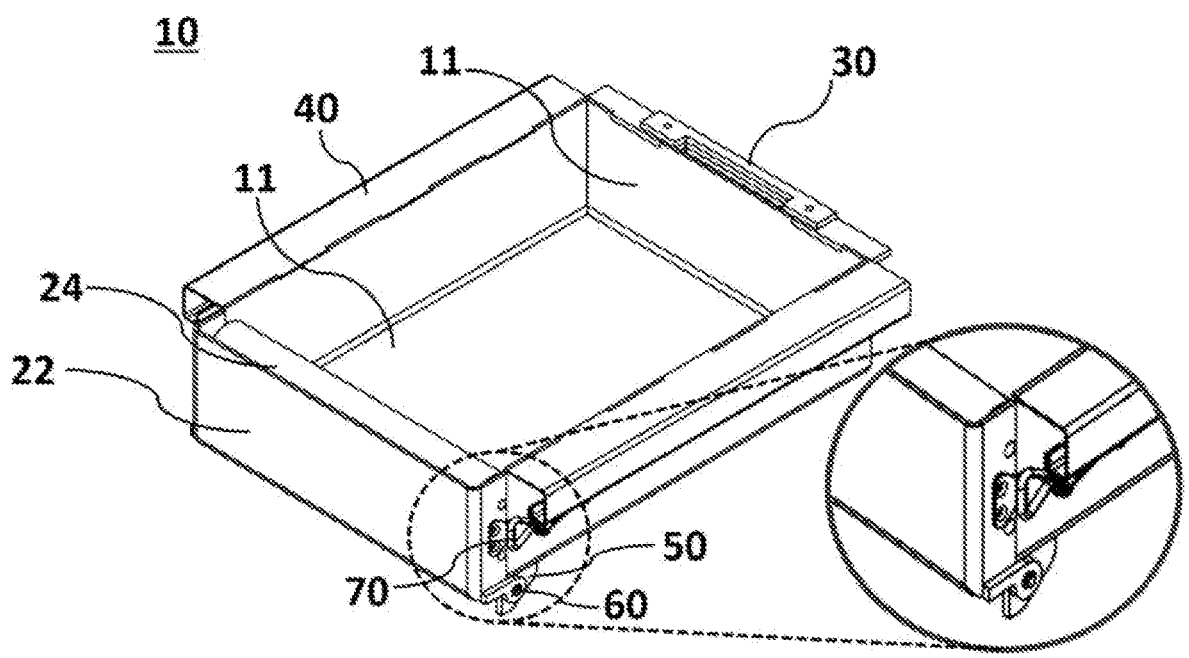
FIG. 2 is a perspective view of the receptacle of FIG. 1, the receptacle being shown in a closed position.

Referring now and comparing FIGS. 1 and 2, panel 20 is configured to rotate between a first position, such as a fully open position as shown in FIG. 1, and a second position, such as a fully closed position as shown in FIG. 2, but the available positions of frame 22 are not limited to these two positions. When removing a build structure from an AM machine, the first position is utilized to allow either one of or both a build structure or build plate to slide over rollers 24 and into receptacle 10. After a build structure is fully received into receptacle 10, panel 20 may be rotated upward towards base 11 into the second position, and latching mechanism 70 may be employed to attach panel 20 to base 11. Latching mechanism 70 may include portions attached to or otherwise positioned on an interior or an exterior of receptacle 10, at adjacent locations of panel 20 and base 11 when the receptacle is in the closed position, so long as the latching mechanism does not interfere with the functionality of roller 24 or the entry of the build structure into the receptacle. As best shown in the example of FIG. 2, latching mechanism 70 may be configured as spring clasps extending from the base 11 that hold the panel 20 fully closed. Latching mechanism 70, however, may be any other appropriate latching mechanism known to those skilled in the art, e.g., a hook-and-loop mechanism or opposing magnets.

When latching mechanism 70 is released, panel 20 may be rotated downward until stopped by stopper 50 attached to base 11. In the example shown, stopper 50 is a flange positioned to abut a portion of frame 22 when panel 20 is in the first position. In this example, when panel 20 is in the first position, a top or outer surface of rollers 24 are positioned in a plane parallel with the bottom surface of base 11 that defines a bottom of an interior region of receptacle 10 for receiving a build structure. Movement of panel 20 from the first position to the second position or vice versa may be manually performed by a user or automatically performed, e.g., by a coil spring in tension attached to both panel 20 and base 11 or by a motor attached to both the panel and the base as known to those skilled in the art. In the case of motorized control of panel 20, an electrical control panel may include buttons or a dial to select desired positions of the panel, and upon selection of a desired position, the motor may cause the panel to rotate to the desired position.

Figure 3:
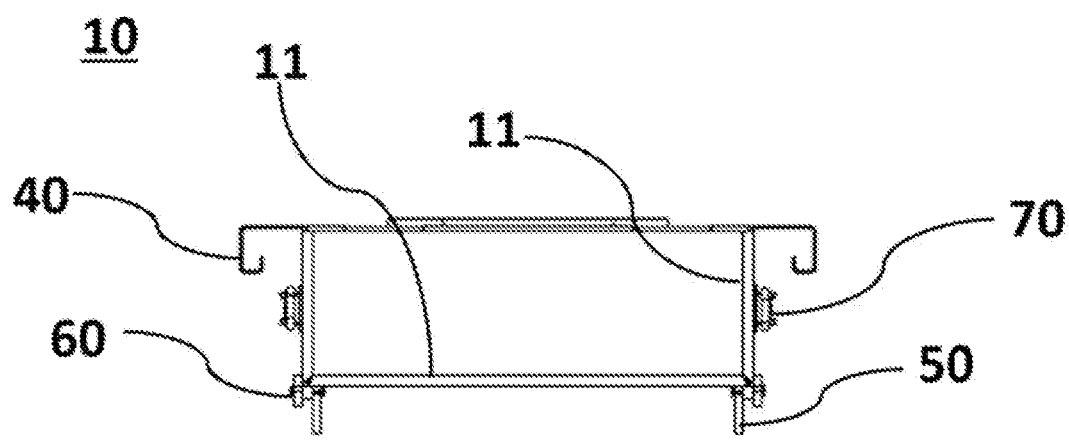
FIG. 3 is a rear view of the receptacle of FIG. 1.

As shown in FIGS. 1-3, receptacle 10 further includes side flanges 40 extending from base 11. As in this example, side flanges 40 may be integral with base 11 such that the side flanges and the base form a one-piece structure that is inseparable without fracture of either one or both of the side flanges and the base. Side flanges 40 may be configured, e.g., bent, curled, or rolled, to provide support surfaces for lifting receptacle 10, and in some arrangements, for engagement with delivery apparatus 300 (see FIG. 6) for transporting and elevating the receptacle. The material used for side flanges 40 may be the same or different than the material for panel 20 and may be coated or covered with frictional material that provides grip and protection to the user while handling receptacle 10. Additionally, receptacle 10 may be reinforced by side flanges 40 to allow receptacle 10 to hold larger or even multiple build structures than the receptacle would hold without the side flanges, but reinforcement of receptacle 10 is not limited to the side flanges and may be accomplished by other means. In this manner, receptacle 10 may be able to safely transport build structures of various sizes and weights.

Figure 4:
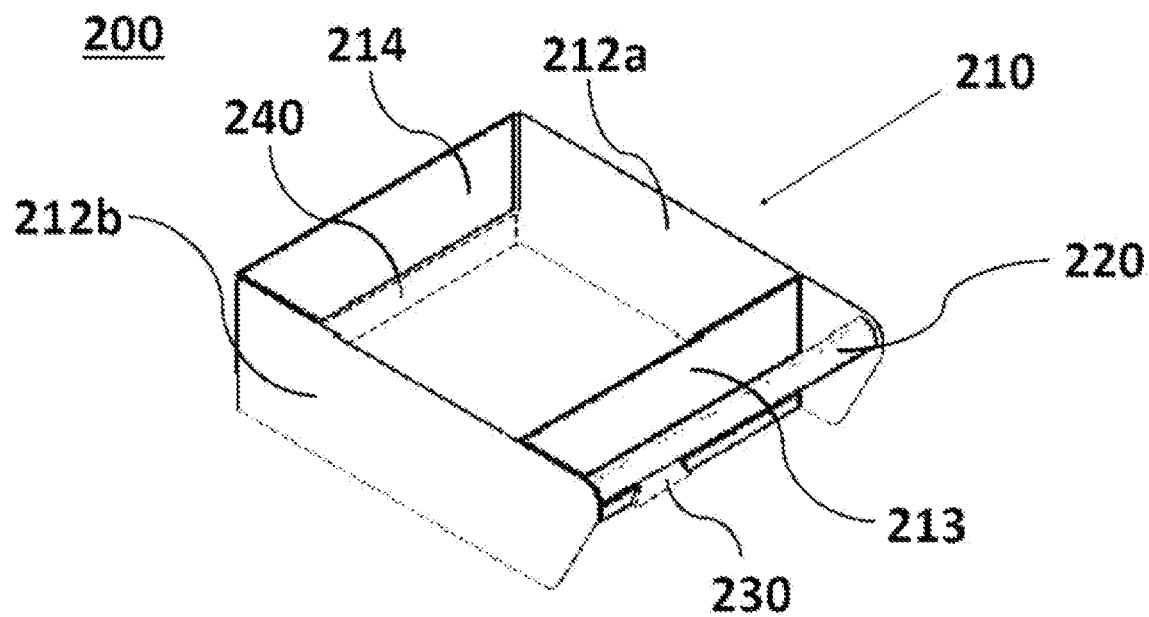
FIG. 4 is a perspective view of a build removal tool in accordance with another aspect.
Figure 5A:
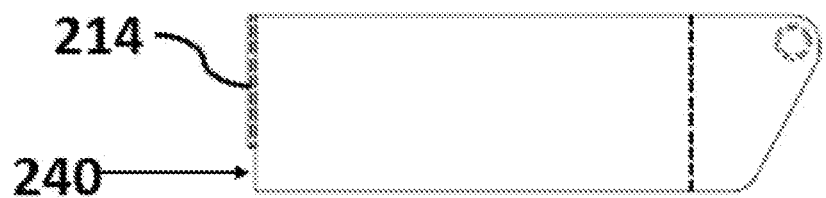
FIGS. 5A and 5B are side and top views of the build removal tool of FIG. 4.
Figure 5B:
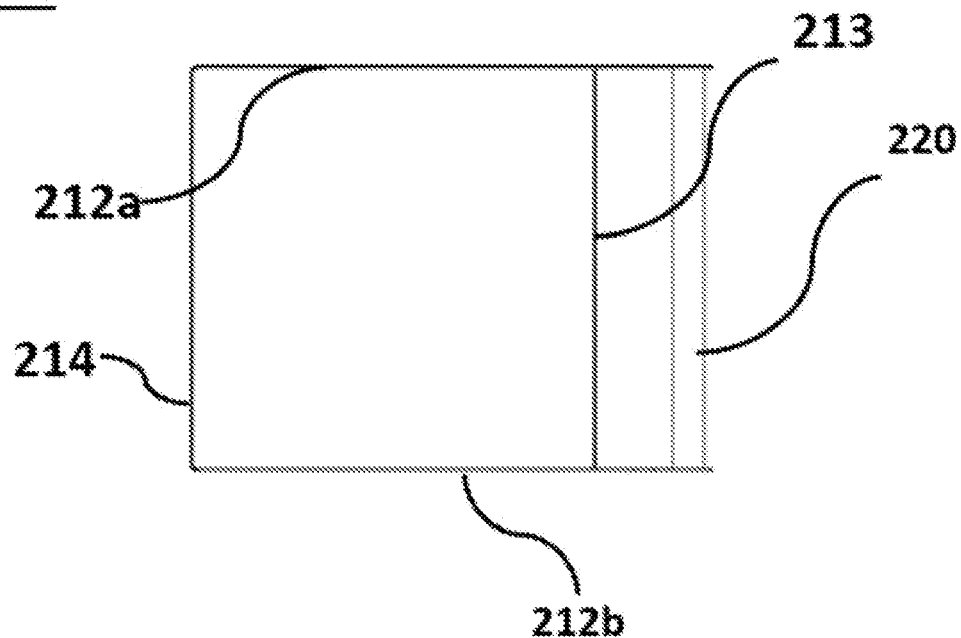

Referring now to FIGS. 4 and 5, build removal tool 200 used to remove a build structure from a build plate in an AM machine generally includes enclosure 210 and handle 220. In the example shown, enclosure 210 is formed by a plurality of walls sufficiently sized and configured to both surround the build structure and fit into an AM machine build chamber. In this manner, enclosure 210 may be placed over and around a build structure and utilized to slide the build structure out of the AM machine. Enclosure 210 may be further slid over roller 24 within frame 22 of panel 20 when the panel is in the first position and then received into receptacle 10. In this example, as shown, opposing walls 212a, 212b of enclosure 210 may extend beyond leading wall 213 of enclosure 210 to define opposing flanges between which handle 220 extends. Handle 220 may be used to facilitate the sliding of build removal tool 200, in particular when a build structure is surrounded by the build removal tool, by pulling handle 220. Utilizing build removal tool 200, a build structure can be removed relatively quickly from an AM machine at high temperatures without a user directly contacting the build structure or internal areas of the AM machine, e.g., the build plate.

Still referring to FIGS. 4 and 5, as in the example shown, build removal tool 200 may include cutout 240 defined by trailing wall 214 having a shorter height than opposing walls 212a, 212b between which the trailing wall extends. Alternatively, build removal tool 200 may be configured to open and close cutout 240 as needed by moving a cutout cover. With either configuration, as build removal tool 200 is slid off the build plate, excess powder passes under cutout 240 of trailing wall 214 of build removal tool 200 and remains on the build plate. In this manner, time and resources are conserved by making the excess powder available for the next AM build without additional post-processing to capture the excess powder.

Figure 7A:
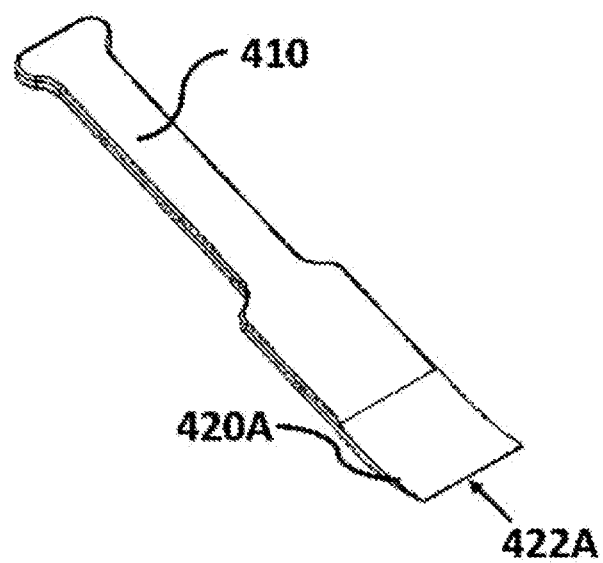
FIG. 7A is a perspective view of a prying tool in accordance with another aspect.
Figure 7B:
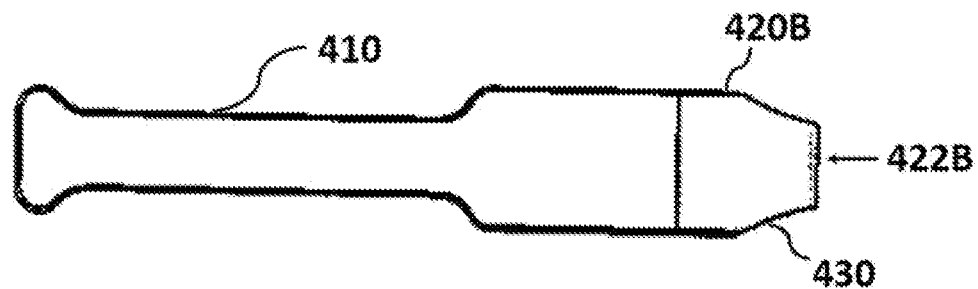
FIG. 7B is a top view of a prying tool in accordance with another aspect.

As further shown in FIG. 4, a bottom edge of leading wall 213 of build removal tool 200 defines notch 230. In the example shown, notch 230 allows a prying tool, e.g., prying tool 400A, 400B, to access the build structure while build removal tool 200 surrounds the build structure. In particular, notch 230 allows prying tool 400A, 400B to be inserted into the interior region of build removal tool 200 such that prying tool 400A, 400B can pry the build structure loose from the build plate upon completion of a build structure or even prior to completion, e.g., as needed to remove a defective build structure. As shown in FIG. 7A, prying tool 400A may have a handle portion 410 on one end and a wedge portion 420A with a thin prying edge 422A on the opposite end in which a width of the wedge portion is less than a width of notch 230. In an alternative arrangement, prying tool 400B may otherwise be in the form of prying tool 400A and include tapered edges 430 defining edges of wedge portion 420B that extend from prying edge 422B of the wedge portion toward handle portion 410, as shown in FIG. 7B. The build structure may be pried loose from the build plate by placing wedge portion 420A. 420B through notch 230 on build removal tool 200 and then pressing downwardly on the handle portion 410 of the prying tool 400A, 400B against a build plate to create an upward pivot movement of the prying edge of the wedge portion 420A, 420B of the prying tool 400A, 400B. In this manner, a technician may remove a build structure without directly contacting the build structure and thus avoid any need to wait until after the build structure has cooled sufficiently. Use of tapered edges 430 reduces surface area at the front of prying tool 400B and thereby provides for easier insertion of prying tool 400B between the build structure and the build plate of the AM machine as well as provides regions for loose powder to fall away from the prying tool during removal of the build structure from the build plate. With build removal tool 200 and prying tool 400A, 400B working in conjunction, a build structure can immediately be pried loose and removed to receptacle 10 whether the build structure is hot or cold.

Figure 6:
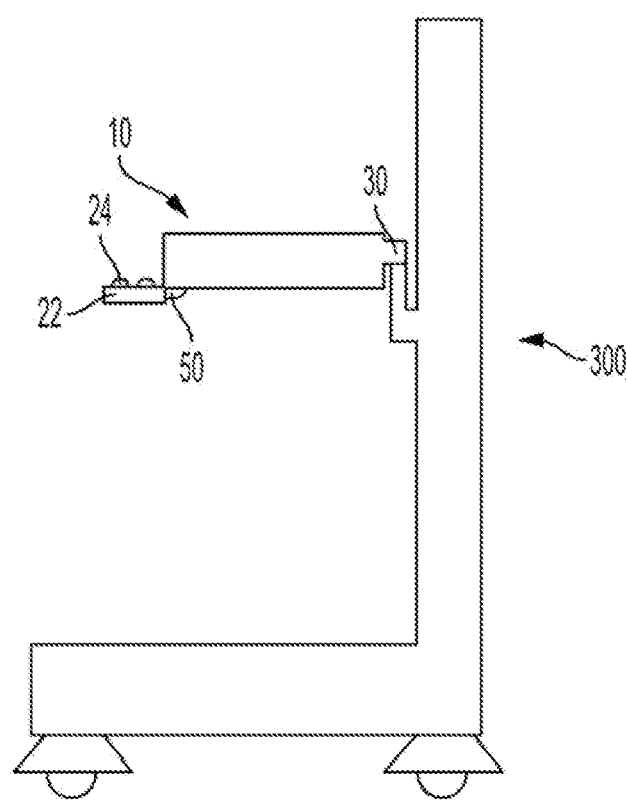
FIG. 6 is a side view of a delivery apparatus and the receptacle of FIG. 1 that is attached to the delivery apparatus in accordance with another aspect.

With reference now to FIG. 6, receptacle 10 is attachable to delivery apparatus 300 configured for either one of or both lifting and transporting the receptacle. As in the example shown, apparatus 300 may be, but is not limited to being, a crane. Receptacle 10 includes back flange 30 (see FIGS. 1 and 2) that extends from leading wall 213 of base 11 that is opposite panel 20 when the panel is in a closed position. Back flange 30 is configured to provide an attachment port through which a flange of delivery apparatus 300 may be received such that receptacle 10 may be attached to apparatus 300, and as in the example shown, remain attached to the apparatus during either one of or both transporting and lifting the receptacle. Delivery apparatus 300 may be motorized or otherwise powered and, in some arrangements, may be controlled by an automated system. Once the build structure has been placed in receptacle 10, apparatus 300 may then transport receptacle 10 for post-processing, e.g., to a blasting chamber for removing excess powder from the build structure that may be recycled for future use by an AM machine.

Figure 8:
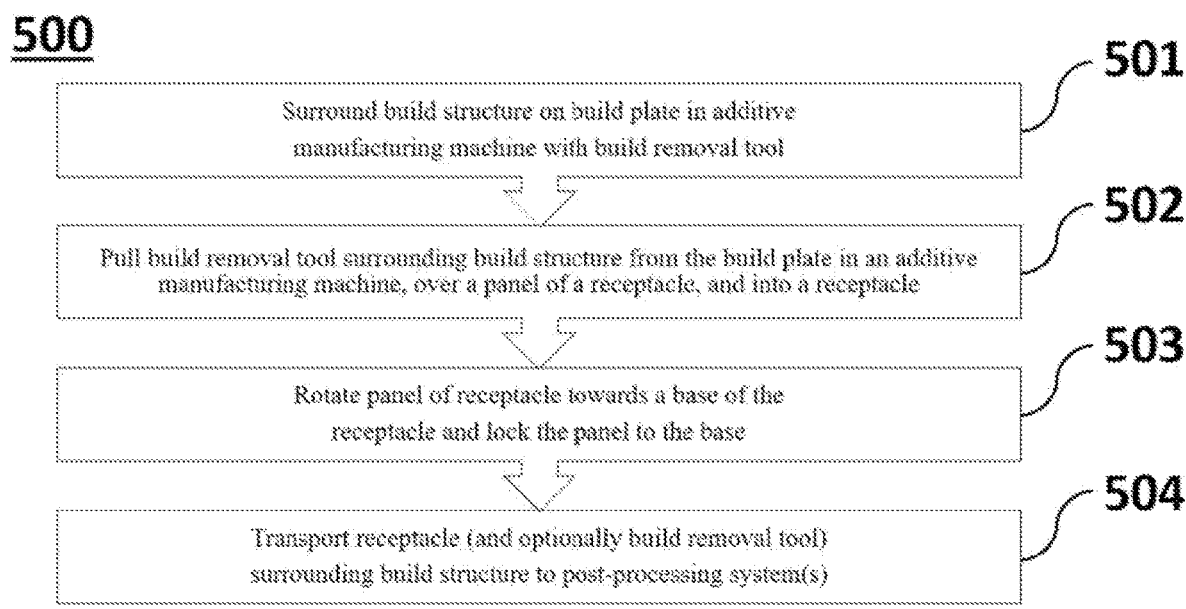
FIG. 8 is a process flow diagram of a process for removing a build structure from an AM machine and transporting the build structure for post-processing in accordance with another aspect.
Figure 9:
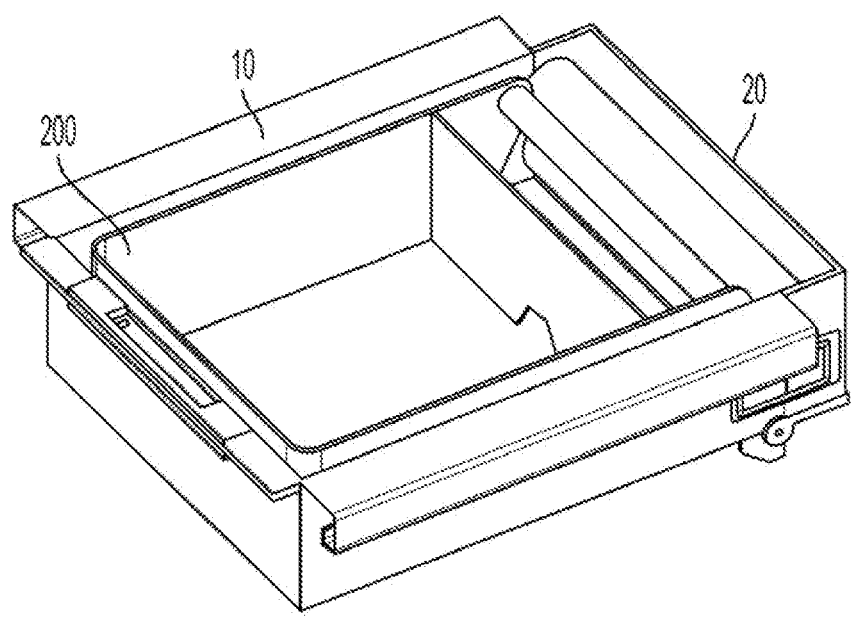
FIG. 9 is perspective view of a build removal tool received into a receptacle in accordance with another aspect.

In reference to FIG. 8, a build structure is removed from an AM system and transported for further processing according to process 500. At a step 501 of process 500, a build removal tool, e.g., build removal tool 200, is placed over a build structure on a build plate of an AM machine to surround the build structure. At step 502, the build structure and the build removal tool surrounding the build structure are removed from the build plate in the AM machine, e.g., by pulling on build removal 200 tool, such that both the build structure and the build removal tool slide into a receptacle, e.g., receptacle 10. At step 503, a panel, e.g., panel 20, of the receptacle is rotated towards a base, e.g., base 11, of the receptacle and the panel is locked to the base, e.g., by latching panel 20 to base 11 of receptacle 10 with latching mechanism 70. At step 504, the receptacle, e.g., receptacle 10, surrounding the build structure is transported to a post-processing system(s), e.g., by moving delivery apparatus 300 attached to the receptacle. In this manner, process 500 allows for a fabricated build structure to be processed remotely from the AM machine to allow quicker fabrication of a subsequent build structure on the AM machine as well as to retain and recycle excess powder from the build structures when processing the build structures remotely from the AM machine. Optionally in process 500, the build removal tool, e.g., build removal tool 200, may be surrounding the build structure while the build removal tool is surrounded by the receptacle, e.g., receptacle 10, as in the example of FIG. 9.

Figure 10A:
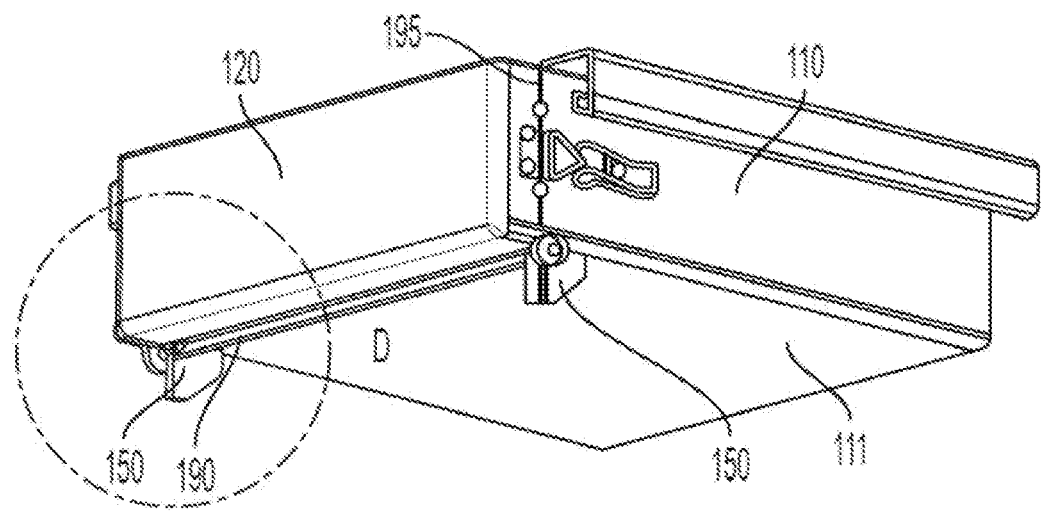
FIG. 10A is a perspective view of a receptacle having a skirt mount in accordance with another aspect of the present disclosure, the receptacle being shown in the closed position.
Figure 10A:
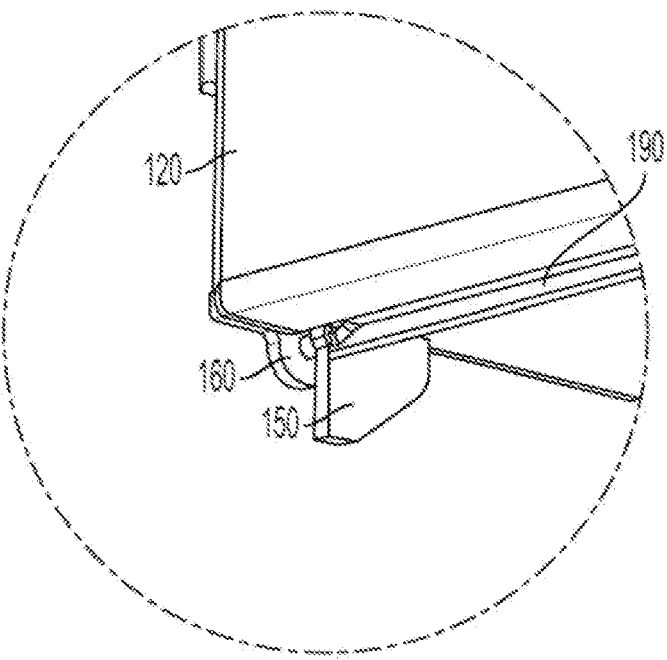
Figure 10B:
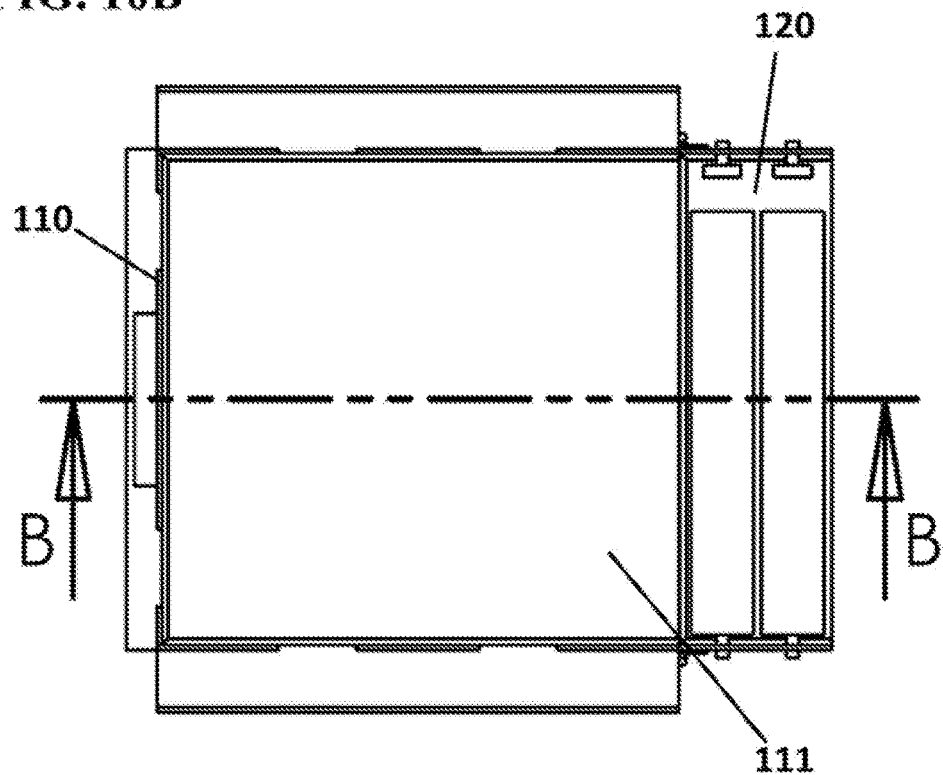
FIG. 10B is a top view of the receptacle of FIG. 10A, the receptacle being shown in the opened position.
Figure 10C:
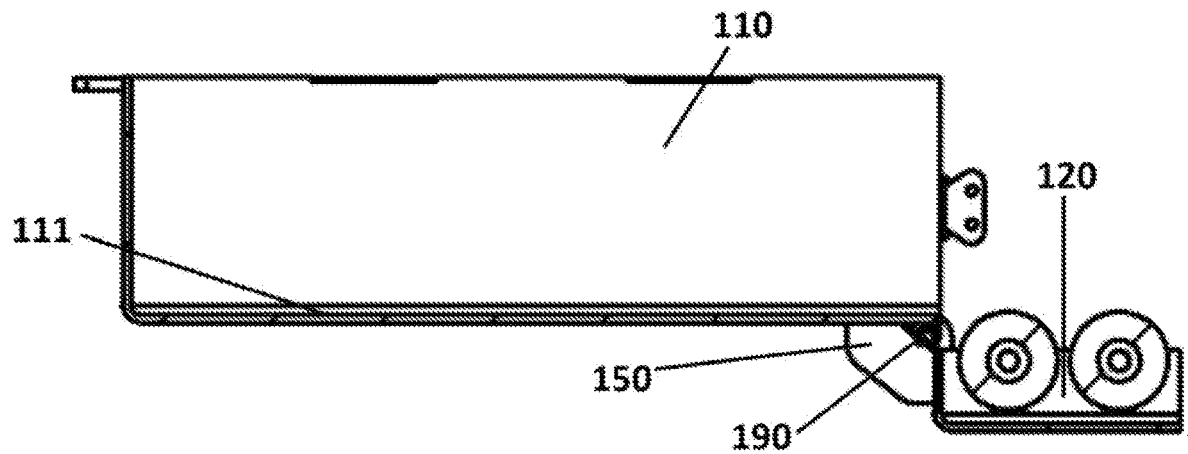
FIG. 10C is a cross-sectional side view of the receptacle of FIG. 10B across line B-B.

As shown in FIGS. 10A-10C, receptacle 110 includes all the same features and components as receptacle 10 with the addition of skirt mount 190 attached to base 111 such that the skirt mount extends along a length of the base between opposing stoppers 150. In some arrangements, skirt mount 190 is fixed in position underneath the divide between the panel 120 and base 111 when the receptacle is in the closed and opened positions. In some arrangements, the skirt mount is pivotably attached to receptacle 110 such that the skirt mount can pivot between a first position and second position, the first being a position in which the skirt mount extends underneath the divide (e.g., divide 195) between panel 120 and base 111 when the receptacle is in the closed position. In some arrangements, the skirt may not be positioned underneath the divide in either the closed or the open positions. In every arrangement, skirt mount 190 is positioned sufficiently close to panel 120 to catch and collect excess powder that may fall between panel 120 and base 111 as the panel rotates between opened and closed positions (i.e., horizontal and vertical orientations). Skirt mount may include features to retain such powder such as a groove disposed therein or one or more sidewalls extending therefrom. In this manner, receptacle 111 captures and conserves valuable metal powder when used in additive manufacturing.

In some alternative arrangements, a build plate may be configured to be removed from an AM machine and transported in a receptacle, e.g., one in the form of receptacle 10. In some such arrangements, upon completion of a build structure, the removable build plate would detach from the AM build machine and slide across roller 24 into receptacle 10 with the build structure still attached to the build plate. This arrangement may be used in conjunction with stackable build plates found in U.S. Pat. No. 11,440,256 to Walsh et al., which is hereby incorporated by reference herein in its entirety. Handles or tabs may be placed on the removable build plate to facilitate removal. Alternatively, a build removal tool, e.g., one in the form of build removal tool 200, may be configured to attach to the removable build plate such that lifting and removing of the removable build plate is performed by lifting and pulling the build removal tool after the build removal tool has been attached to the removable build plate. A technician may employ the build removal tool to pull the removable build plate and the build structure attached to the removable build plate out of the AM machine and into receptacle 10. In this manner, the technician can relocate the combination build structure and build plate to a safer environment, e.g., an oxygen-free environment, for post-processing when dealing with highly flammable metal powders before prying the build structure from the removable build plate.

It is to be understood that the disclosure set forth herein includes any possible combinations of the particular features set forth above, whether specifically disclosed herein or not. For example, where a particular feature is disclosed in the context of a particular aspect, arrangement, configuration, or arrangement, that feature can also be used, to the extent possible, in combination with and/or in the context of other particular aspects, arrangements, configurations, and arrangements of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative arrangements and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. A receptacle configured for use in the retention and transfer of an in-process fused powder build structure from an additive manufacturing machine comprising:
    a base including a bottom surface;
    a door panel connected to the bottom surface by a hinge, the door panel comprising:
        a frame; and
        a roller extending from the frame,
        wherein the frame is attached or attachable to the base such that the door panel is moveable between a first position in which a top surface of the roller lies in a first plane parallel to a second plane defined by the bottom surface of the base and a second position in which the door panel and the base surround the build structure when the build structure is retained by the receptacle.

2. The receptacle of claim 1, wherein the frame extends beneath and along a length of the roller, the frame being configured to catch powder from the build structure.

3. The receptacle of claim 1, further comprising a stopper attached to the base or the door panel and configured to prevent the door panel from rotating beyond the first position.

4. The receptacle of claim 1, further comprising a first flange and a second flange on opposite sides of the door panel, each of the first and the second flanges being configured for placement on respective surfaces such that the first and the second flanges support the receptacle.

5. The receptacle of claim 1, wherein at least one location of the door panel is detachably attached to the base in the second position by a latching mechanism.

6. An additive manufacturing system comprising:
    the receptacle of claim 1; and
    a build removal tool for use in the removal of the build structure from a build plate in the additive manufacturing machine, the build removal tool having a shape configured to substantially correspond to a perimeter of the build structure, to be placed over the build structure, and to be slid along the roller and into the receptacle while retaining the build structure.

7. The additive manufacturing system of claim 6, further comprising
    a prying tool configured to pry loose the build structure from a build plate of the additive manufacturing machine on which the build structure is formed.

8. The additive manufacturing system of claim 7,
    wherein the build removal tool includes a wall defining a notch, wherein the prying tool includes a handle portion on one end and a wedge portion on an opposite end of the prying tool,
    wherein the notch is configured for receiving and limiting movement of the wedge portion of the prying tool when the wedge portion is placed under the build removal tool and the handle portion is pressed downwardly against a build plate of the additive manufacturing machine, and
    wherein the handle portion causes an upward pivot movement of the wedge portion against the build structure when the handle portion is pressed downwardly against the build plate of the additive manufacturing machine while the wedge portion is under the build structure.

9. The additive manufacturing system of claim 6, wherein the build removal tool includes a plurality of walls in a rectangular shape defining the perimeter and configured to be placed around the build structure, the build removal tool further including a handle extending from the walls.

10. The additive manufacturing system of claim 9, wherein a first wall of the plurality of walls of the build removal tool has a cutout that allows for passage of loose powder during the removal of the build structure from the build plate.

11. An additive manufacturing system, comprising:
    the receptacle of claim 1; and
    an additive manufacturing machine including a build plate, wherein the receptacle defines a perimeter sufficient to surround the build structure, and wherein receptacle is configured for placement on the build plate such that no portion of the perimeter of the build structure extends beyond the build plate.

12. An additive manufacturing system, comprising:
    the receptacle of claim 1; and
    a lifting mechanism,
    wherein the base comprises a wall and a flange extending from the wall, the flange being configured for attachment to the lifting mechanism.

13. The additive manufacturing system of claim 12, further comprising:
    an additive manufacturing machine; and
    a post-processing system configured for separating one or more components from portions of the build structure unintended for further processing, wherein the lifting mechanism is moveable between a location adjacent to the additive manufacturing machine and the post-processing system.

14. A receptacle for use in the retention and transfer of an in-process fused powder build structure from an additive manufacturing machine comprising:
    a base including a bottom surface and four walls extending from the base;
    a panel comprising:
        a frame;
        a hinge, wherein the frame is attached to the base such that the panel is rotatable;
        a roller extending from the frame, wherein the frame is attached or attachable to the base such that the panel is moveable between a first position in which a top surface of the roller lies in a first plane parallel to a second plane defined by the bottom surface of the base and a second position in which the panel and the base surround the build structure when the build structure is retained by the receptacle; and a cavity, wherein the cavity extends beneath and along a length of the roller, the cavity being configured to catch powder from the build structure;

a stopper attached to the base or the panel and configured to prevent the panel from rotating beyond the first position;

a first flange and a second flange on opposing walls of the base, each of the first and the second flanges being configured for placement on respective surfaces such that the first and the second flanges support the receptacle;

a latching mechanism, wherein the panel is detachably attached to the base, at least one location of the panel, in the second position; and a third flange extending from the base opposite of the frame, wherein the third flange is configured for attachment to a lifting mechanism.

15. An additive manufacturing system comprising:

the receptacle of claim 1;

a build removal tool for use in the removal of the build structure from a build plate in the additive manufacturing machine, the build removal tool having a plurality of walls in a rectangular shape defining the perimeter and configured to be placed around the build structure, the build removal tool further including a handle extending from the walls, wherein the build removal tool is configured to be slid along the roller and into the receptacle while retaining the build structure by pulling the handle;

a prying tool configured to pry loose the build structure from a build plate of the additive manufacturing machine on which the build structure is formed; and a lifting mechanism configured to lift and transport the build structure in the receptacle, wherein the third flange of the receptacle is configured for attachment to the lifting mechanism.

\* \* \* \* \*